(12) United States Patent
Chen et al.

(10) Patent No.: US 7,534,352 B2
(45) Date of Patent: May 19, 2009

(54) REVERSED ENDCAPPING AND BONDING OF CHROMATOGRAPHIC STATIONARY PHASES USING HYDROSILANES

(75) Inventors: Wu Chen, Newark, DE (US); William E. Barber, Landenberg, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 73 days.

(21) Appl. No.: 11/743,125

(22) Filed: May 1, 2007

(65) Prior Publication Data

US 2008/0272043 A1 Nov. 6, 2008

(51) Int. Cl.
*B01D 15/08* (2006.01)
(52) U.S. Cl. ............... 210/635; 210/656; 210/198.2
(58) Field of Classification Search ............... 210/635, 210/656, 658, 659, 198.2, 198.3
See application file for complete search history.

(56) References Cited

U.S. PATENT DOCUMENTS

| | | | |
|---|---|---|---|
| 4,017,528 | A | 4/1977 | Unger et al. |
| 4,705,725 | A | 11/1987 | Glajch et al. |
| 5,134,110 | A | 7/1992 | Sudo et al. |
| 5,374,755 | A | 12/1994 | Neue et al. |
| 5,948,531 | A | 9/1999 | Kirkland et al. |
| 6,159,540 | A | 12/2000 | Menon et al. |
| 6,210,570 | B1 | 4/2001 | Holloway |
| 2004/0227127 | A1 | 11/2004 | Boswell et al. |
| 2005/0045559 | A1* | 3/2005 | Wang et al. ............ 210/656 |
| 2005/0178730 | A1* | 8/2005 | Li ............ 210/656 |
| 2005/0242038 | A1 | 11/2005 | Chen |
| 2006/0000773 | A1 | 1/2006 | Glennon et al. |
| 2006/0207923 | A1* | 9/2006 | Li ............ 210/198.2 |
| 2007/0187313 | A1* | 8/2007 | Ekeroth ............ 210/198.2 |

FOREIGN PATENT DOCUMENTS

| | | |
|---|---|---|
| EP | 0 397 301 | 11/1990 |
| GB | 2 437 953 | 11/2007 |
| WO | WO 00/71246 | 11/2000 |
| WO | WO 2005/095525 | 10/2005 |
| WO | WO 2005/108292 | 11/2005 |

OTHER PUBLICATIONS

U.S. Patent Application entitled "Chromatographic Stationary Phase," filed Apr. 27, 2006, now U.S. Appl. No. 11/412,564.
"Introduction to Modern Liquid Chromatography" Second Edition, Snyder et al (61 pages) (copyright 1979 by John Wiley & Sons, Inc.); see Chapter 7.
"Role of the Functional Group in n-Octyldimethylsilanes in the Synthesis of C8 Reversed-Phase Silica Packings for High-Performance Liquid Chromatography", Journal of Chromatography, 352 (1986) pp. 199-211 (Lork et al).
"Characterization of a New Dehydroxylated Reversed-Phase Material", Journal of Chromatography, 267 (1983) pp. 39-48 (Welsch et al).
"Chemically Modified Silicon Dioxide Surfaces", Advances in Colloid and Interface Science, 6 (1976) pp. 95-137 (Boksanyi et al).
"Silica and Other Materials as Supports in Liquid Chromatography. Chromatographic Tests and their Importance for Evaluating these Supports. Part I", Chromatographia Supplement vol. 53, 2001; pp. S-113 through S-131 (Stella et al).
"Silane Coupling Agents: Connecting Across Boundaries" by Gelest, Inc. (2006) (60 pages).
"Dioxiranes: Synthesis and Reactions of Methyldioxiranes", J. Org. Chem. 1985, 50, pp. 2847-2853 (Murray et al).

* cited by examiner

*Primary Examiner*—Ernest G Therkorn
(74) *Attorney, Agent, or Firm*—Marc Bobys

(57) ABSTRACT

A process for producing a chromatographic stationary phase for use in reversed-phase chromatography. Chromatographic stationary phases prepared according to the methods of the current invention and liquid chromatography columns, which include the stationary phases, are also provided.

7 Claims, No Drawings

REVERSED ENDCAPPING AND BONDING OF CHROMATOGRAPHIC STATIONARY PHASES USING HYDROSILANES

FIELD OF THE INVENTION

The present invention relates to chromatographic stationary phases for use in liquid chromatography. More particularly, the present invention relates to chromatographic stationary phases for use in reversed-phase HPLC.

BACKGROUND

Silica particles are, by far, the most widely used supports for reversed-phase liquid chromatography stationary phases. The high mechanical stability, monodisperse particles, high surface area, and easily tailored pore size distributions make silica superior to other supports in terms of efficiency, rigidity, and performance. Silica bonding chemistry also allows for a wide variety of stationary phases with different selectivities to be made on silica.

Silanes are the most commonly used surface modifying reagents in liquid chromatography. For example, *An Introduction to Modern Liquid Chromatography*, Chapter 7, John Wiley & Sons, New York, N.Y. 1979; *J. Chromatogr.* 352, 199 (1986); *J. Chromatogr.* 267, 39 (1983); and *Advances in Colloid and Interface Science* 6, 95 (1976) each disclose various silicon-containing surface modifying reagents.

Typical silane coupling agents used for silica derivatization have the general formula $EtOSiR_1R_2R_3$ or $ClSiR_1R_2R_3$, where each R represents organic groups, which can differ from each other or all be the same. For reversed-phase chromatography, the silane coupling agent has traditionally been $—Si(CH_3)_2(C_{18}H_{37})$, where $C_{18}H_{37}$, an octadecyl group, yields a hydrophobic surface. The reaction, when carried out on the hydroxylated silica, which typically has a maximum surface silanol concentration of approximately 8 $\mu mol/m^2$, does not go to completion due to the steric congestion imposed by the octadecyl groups on the coupling agent.

To improve the quality of the original chemically bonded phase by blocking access to some residual silanol groups on the silica surface, the bonded phase is usually further endcapped using small organic silanes. The endcapping is usually carried out with compounds able to generate trimethylsilyl groups, $(CH_3)_3—Si—$, the most popular being trimethylchlorosilane (TMCS) and hexamethyldisilazane (HMDS). The majority of free surface silanols, which are under the dimethyloctadecylsilyl groups, cannot react with the endcapping reagents because of steric hindrance. In the traditional endcapping step, only ~0.2 $\mu mol/m^2$ surface silanol groups are bonded based on the carbon loading data. The highest coverage attained in laboratory studies has been ~4.5 $\mu mol/m^2$, while the coverage available in commercial chromatography columns is much less, usually on the order of 2.7-3.5 $\mu mol/m^2$, even after endcapping.

These residual surface silanols interact with basic and acidic analytes via ion exchange, hydrogen bonding and dipole/dipole mechanisms. However, this secondary interaction between analytes and residual silanol groups results in increased retention times, excessive peak tailing, especially at mid pH range for basic compounds, and irreversible adsorption of some analytes.

To overcome the problems of residual silanol activity, many methods have been tried such as the use of ultrapure silica, the use of carbonized silica, the coating of the silica surface with polymeric compositions, the endcapping of residual silanol groups, and the addition of suppressors such as long chain amines to the eluent. In practice, however, none of these approaches has been totally satisfactory. A general review of silica support deactivation is given by Stella et al. [*Chromatographia* (2001), 53, S-113-S115].

A method to eliminate surface silanols by extreme endcapping is described in U.S. Pat. No. 5,134,110. While traditional endcapping can physically bond some residual silanol groups, at least 50% of the surface silanols remain unreacted. U.S. Pat. No. 5,134,110 describes an endcapping method for octadecyl-silylated silica gel by high temperature silylation. Polymeric chemically bonded phases originated from trichlorosilanes were endcapped using hexamethyldisilazane or hexamethylcyclo-trisiloxane at very high temperature, above 250° C., in a sealed ampoule. The resulting endcapped phases were shown to perform with excellence on the Engelhardt test. This result was explained by the formation of dimethylsilyl loop structures on the surface, leading to the elimination of silanols. This method had the disadvantage in that it was used on a polymeric phase, and polymeric phases usually have poor mass transfer and poor reproducibility. Also the high temperature of silylation in a sealed ampoule is not practical and difficult to perform commercially, as compared with the traditional liquid phase endcapping procedure.

Another method of reducing the effect of surface silanols is to introduce polar embedded groups in the octadecyl chain. These embedded groups, generally contain nitrogen atoms and amides such as disclosed in European Patent No. EP0397301 and carbamates such as disclosed in U.S. Pat. No. 5,374,755. Most recently, urea groups have been shown to reduce the undesirable silanol interactions. Phases with incorporated polar groups clearly exhibit lower tailing factors for basic compounds, when compared with traditional C-18 phases. Some mechanisms have been proposed, while some evidence leads to the belief that the surface layer of an embedded polar group phase should have a higher concentration of water due to the hydrogen bonding ability of the polar groups near the silica surface. This virtual water layer suppresses the interaction of basic analytes with residual surface silanols and permits separation with mobile phase having 100% water.

A disadvantage of this approach is that the presence of the water layer seems to contribute to a higher dissolution rate of the silica support, as compared to their alkyl C-8 and C-18 counterparts. In a systematic column stability evaluation, an embedded amide polar stationary phase was shown to be less stable. This result may be predictable, due to the higher water content near the underlying silica surface for polar embedded phases. The embedded polar groups also cause adsorption of some analytes when the phases are hydrolyzed or the phases are not fully reacted during phase preparation, leaving amine or hydroxyl groups on the surface. For example, the hydrolyzed amide phase leaves aminopropyl moieties on the surface, that strongly adsorb acidic and polar compounds, causing their peaks to be tailed, or to be missing completely.

The polar embedded phases are also more hydrophilic than the traditional C-18 phases, enhancing the retention of polar compounds, whereas the retention of hydrophobic analytes is much less on polar-embedded columns than on the traditional C-18 columns. As a result, the phase selectivity is quite different from traditional C-18, which causes a change in the order in which analytes elute relative to each other from the column. Consequently, methods developed on traditional C-18 columns cannot be transferred to polar embedded phase columns.

Another method for reducing the effect of surface silanols is to use a phase that can sterically protect surface silanols. U.S. Pat. No. 4,705,725 to Du Pont discloses bulky diisobutyl (with C-18) or diisopropyl (with C-8, C3, phenyl propyl, cyano propyl) side chain groups (Zorbax® Stable Bond reversed-phase columns) that stabilize both long and short chain monofunctional ligands and protect them from hydrolysis and loss at low pH. The bulky side groups increase the hydrolytic stability of the phase. Such a moiety is less vulnerable to destruction at low pH, and better shields the underlying silanols. The sterically protected phases are extremely stable at low pH. The sterically protected silane phases are not endcapped; therefore, the loss of small, easily hydrolyzed endcapping reagents under acidic mobile phase condition is avoided. At pH<3, the phase has excellent performance, in terms of peak shape, retention, reproducibility, and lifetime. In this pH range, the silanol groups on a type B silica are nearly completely protonated, and as a result, they do not act as sites for secondary interaction. The coverage density is, however, much lower than for dimethyl ODS phases. The ligand density of diisobutyloctadecyl phase is ~2 μmol/m² when compared to the conventional dimethyloctadecyl phase with a ligand density of 3.37 mmol/m².

U.S. Pat. No. 5,948,531 discloses the use of bridged propylene bidentate silanes or a bidentate C-18 phase (Zorbax® Extend-C-18 columns), to restrict analyte access to residual silanols by incorporating a propylene bridge between two C-18 ligands. The bidentate C-18 phase retains the benefits of monofunctional silane phases (high column efficiency, reaction repeatability) while demonstrating good stability in high and low pH mobile phases. Zorbax Stable-Bond C-18 (SB-C-18) and Zorbax Extend-C-18 columns also have very similar selectivity to the traditional C-18 columns.

Basic compounds appear in widely divergent areas, such as the environmental, chemical, food, and pharmaceutical industries. In the latter, in particular, over 80% of commercialized drugs are estimated to possess a basic function. Therefore, it is of crucial importance to develop practical HPLC stationary phases having minimized surface silanol activity.

SUMMARY OF THE INVENTION

The present invention is directed a process for producing a chromatographic stationary phase for use in reversed-phase chromatography by providing an inorganic oxide support material comprising surface hydroxyl groups; reacting the surface hydroxyl groups with at least one endcapping reagent having a formula selected from I, II, and III:

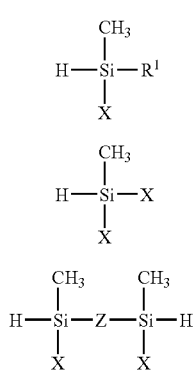

wherein, $R^1$ is hydrogen or methyl, X is halogen, $OR^2$ or $NR^3R^4$, and Z is —NH— or —NR⁵—, wherein $R^2$ is $C_1$ to $C_{30}$ alkyl, $R^3$ and $R^4$ are independently hydrogen or $C_1$ to $C_{30}$ alkyl, and $R^5$ is methyl or ethyl, to provide a modified particulate support material having at least one endcap Si—H group; converting at least one endcap Si—H group to an endcap silanol group; and reacting the endcap silanol group with at least one silane coupling agent selected from IV, V, VI, and VII:

wherein $R^{6-15}$ are independently hydrogen or $C_1$ to $C_{30}$ hydrocarbyl, optionally substituted with at least one reversed-phase chromatography ligand; Y is halogen, $OR^2$ or $NR^3R^4$, wherein $R^2$ is $C_1$ to $C_{30}$ alkyl, and $R^3$ and $R^4$ are independently hydrogen or $C_1$ to $C_{30}$ alkyl; m is 1 or greater; and n is 1 or greater to provide a functionalized particulate support material.

Chromatographic stationary phases prepared according to the methods of the current invention and liquid chromatography columns, which include the stationary phases, are also provided.

DETAILED DESCRIPTION OF THE INVENTION

The present invention provides a novel improvement to a chromatographic stationary phase for use in reversed-phase chromatography. It has been found that reversing endcapping and bonding by first endcapping the surface hydroxyl groups of an inorganic oxide support material with smaller mono and dimethyl hydrosilanes, instead of the traditional trimethyl silanes, followed by converting at least one endcap Si—H group to an endcap silanol group and reacting the endcap silanol group with at least one silane coupling agent, results in improved total coverage of surface silanols, which surface coverage reaches as high as 5-7 μmol/m². For example, silica bonded with —SiMe₂H has surface coverage of 5.10 μmol/m², and silica bonded with difunctional bis(dimethylamino) methylsilane has surface coverage of 6.9 μmol/m².

A more hydrophobic inorganic oxide surface that is more resistant to dissolution at middle and high pH conditions is also produced. The endcap silanol groups on the functionalized silica support material are much less acidic than silica surface silanols. Furthermore, the functionalized support material provides exceptional peak shapes for strong bases.

According to the process of the current invention, the endcapping mono and/or dimethyl hydrosilanes are introduced to the chromatographic support prior to the introduction of the hydrophobic phase. Suitable inorganic oxide support materials include those typically utilized in liquid chromatography, for example, silica, hybrid silica, an example of which is disclosed in U.S. Pat. No. 4,017,528, the contents of which are incorporated herein by reference, alumina, titanium oxide, and zirconium oxide. Furthermore, the support can be in any form suitable for use in liquid chromatography. Suitable forms include porous particles, non-porous particles, porous membranes, and porous monoliths, an example of which is disclosed in U.S. Pat. No. 6,210,570 the contents of which are incorporated herein by reference. As used herein, the term "porous" means any chromatographically-suitable degree of porosity. The term "porous particles" also includes superficially porous particles, for example, non-porous particles coated with a porous outer layer.

The endcapping is done in an inert solvent, such as toluene, tetrahydrofuran or another inert hydrocarbon, under reflux conditions according to methods that are well known in the art. The endcapping agent may be introduced using any silane capable of generating a mono or dimethyl hydrosilyl groups in solution at reflux or in a gas phase reaction since small mono or dimethyl hydrosilanes have low boiling point temperatures.

Preferred endcapping reagents according to the current invention are selected from formulas I, II, and III:

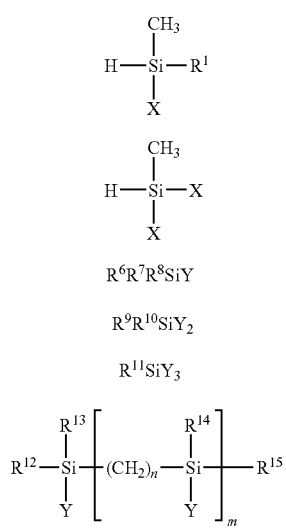

wherein $R^{6-15}$ are independently hydrogen or $C_1$ to $C_{30}$ hydrocarbyl, optionally substituted with at least one reversed-phase chromatography ligand; Y is halogen, $OR^2$ or $NR^3R^4$, wherein $R^2$ is $C_1$ to $C_{30}$ alkyl, and $R^3$ and $R^4$ are independently hydrogen or $C_1$ to $C_{30}$ alkyl; m is 1 or greater; and n is 1 or greater. Preferably, at least one of $R^{6-15}$ is a saturated or unsaturated hydrocarbyl, a cyclic hydrocarbyl, or an aryl hydrocarbyl. More preferable, at least one of $R^{6-15}$ is $C_{18}H_{37}$ or $C_8H_{17}$. Where Y is a halogen, an acid scavenger, such as imidazole or pyridine is added to the reaction mixture. Typical methodologies for introducing the hydrophobic phase are described in Silane Coupling Agents: Connecting Across Boundaries, published by Gelest, Inc. (2004), and available at www.gelest.com/company/pdfs/couplingagents.pdf. The methods described therein are also useful for introducing the endcapping agent. The current invention does not depend on the manner in which the silane coupling agent is introduced, and it is contemplated that the current invention will be applicable to all conventionally known ways of introducing the silane coupling agent.

The silane coupling agents used for the hydrophobic phase may contain any ligand commonly used in stationary phases for reversed-phase HPLC. For example, when bonded to endcap silanol groups, the resulting structure of formula IV is:

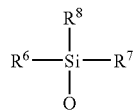

wherein the oxygen atom forms the bond to the endcap agent and $R^{6-8}$ are defined as above. As used herein, the term hydrocarbyl means any ligand comprising a straight chain, branched, or cyclic carbon backbone. Further, the ligand may contain one or more unsaturated moieties and in the case of cyclic moieties, may be aryl. Still further, the ligand may be substituted with any moiety commonly used in reversed-phase HPLC. Exemplary ligands used for stationary phases for reversed-phase HPLC include alkyl, aryl, cyano, diol, nitro, amides, amines, phenyl, nitrites, butyl, octyl, octadecyl, cation or anion exchange groups, and embedded polar functionalities, for example, amides, ethers, and carbamates. For the purposes of the current invention the identity of the specific coupling agent is not critical, as the invention is applicable generally to reversed-phase chromatographic stationary phases.

Chromatographic stationary phases prepared according to the methods of the current invention and liquid chromatography columns, which include the stationary phases, are also provided. The chromatographic stationary phase can include an inorganic oxide support material having bonded thereto, via Si—O bonds, at least one silane of formula VIII:

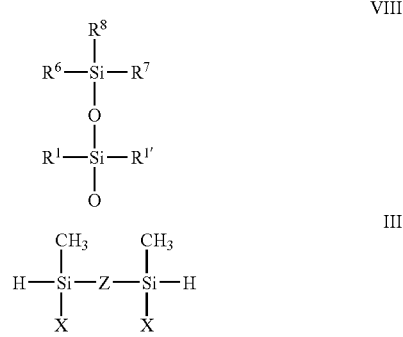

wherein, $R^1$ is hydrogen or methyl, X is halogen, $OR^2$ or $NR^3R^4$, and Z is —NH— or —$NR^5$—, wherein $R^2$ is $C_1$ to $C_{30}$ alkyl, $R^3$ and $R^4$ are independently hydrogen or $C_1$ to $C_{30}$ alkyl, and $R^5$ is methyl or ethyl. In the case that an endcapping agent according to formula III is used, the endcapping agent is capable of producing two Si—O bonds, and thus, occupies two surface hydroxyl. Where X is a halogen, an acid scavenger, such as imidazole or pyridine is added to the reaction mixture. When bonded to the inorganic oxide support material, the endcapping agents have formulas selected from IX and X:

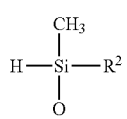

-continued

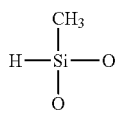

X wherein the oxygen atoms form the bond to the support material.

Preferably, Si—H groups are converted to Si—OH in a dioxiran solution or an Oxone™ (active ingredient: potassium peroxymonosulfate, KHSO$_5$ [CAS-RN 10058-23-8]) buffer solution.

The silane coupling agent used to create the hydrophobic phase may be introduced in any manner commonly known in the art. Typically, the hydrophobic phase is introduced by reacting the endcap Si—OH groups with a silane selected from formulas IV, V, VI, and VII:

wherein $R^1$ and $R^{1'}$ are independently hydrogen or methyl and $R^8$, $R^9$ and $R^{10}$ are independently hydrogen or $C_1$ to $C_{30}$ hydrocarbyl, optionally substituted with at least one reversed-phase chromatography ligand.

EXAMPLES

Example 1

Endcapping Surface Silanols of a Silica Support with SiMe$_2$H

Surface silanols of a silica support were endcapped with SiMe$_2$H according to the following method: 32.56 g silica with surface area of 260 m$^2$/g was charged into a 250 ml three necked flask equipped with a Barrett trap and a water condenser. 150 ml toluene was added. 30 ml toluene was distilled out and collected in the Barrett trap. After the mixture was allowed to cool below 100° C., the Barrett trap was removed, and a new water condenser was attached. (Dimethylamino) dimethylsilane (8.37 g, 81.26 mmol) was added. The mixture was then stirred under reflux conditions overnight (18-24 hours). The silica was filtered, washed with 50 ml toluene, 50 ml THF, and 50 ml CH$_3$CN, and air-dried. The silica was then dried under vacuum at 120° C. overnight. The silica had a carbon loading of 3.16%, 5.10 μm/m$^2$ coverage.

Example 2

Endcapping Surface Silanols of a Silica Support with SiMeH

Surface silanols of a silica support were endcapped with SiMeH according to the following method: 38.18 g silica with surface area of 260 m$^2$/g was charged into a 250 ml three necked flask equipped with a Barrett trap and a water condenser. 150 ml toluene was added. 30 ml toluene was distilled out and collected in the Barrett trap. After the mixture was allowed to cool below 100° C., the Barrett trap was removed, and a new water condenser was attached. Bis(dimethylamino)methylsilane (8.37 g, 81.26 mmol) was added. The mixture was then stirred under reflux conditions overnight (18-24 hours). The silica was filtered, washed with 50 ml toluene, 50 ml THF. The silica was reslurried in 120 ml THF/water (80/20 v/v), and was stirred under reflux conditions for 1 hour. The silica was filtered, washed with 50 ml toluene, 50 ml THF and 50 ml CH$_3$CN, and air-dried. The silica was then dried under vacuum at 120° C. overnight. The silica had a carbon loading of 2.14%, 6.90 μm/m$^2$ coverage.

Example 3

Converting Si—H to Si—OH

A dioxirane solution was used to convert Si—H groups to Si—OH. The synthesis of dioxirane is described in *J. Org. Chem.*, Vol. 50, No. 16, 2847-2853 (1985). A dioxirane solution was prepared as follows: a mixture of 20 ml water/15 ml acetone was added to a mixture of 20 ml water/15 ml acetone/ 24 g NaHCO$_3$ in a three necked flask equipped with an additional funnel, an additional funnel for solid, and a connector connected to a dry ice condenser with a cold trap below. At the same time, 50 g Oxone™ (active ingredient: potassium peroxymonosulfate, KHSO$_5$ [CAS-RN 10058-23-8]) was added. After addition, the mixture was stirred for 15 minutes. The additional funnels were removed. N$_2$ was purged while slight vacuum was applied. The product dioxirane was condensed at the dry ice condenser and collected in the flask in the cold trap (about 30 ml).

Endcapped silica prepared according to Example 1 (4.6 g silica particles bonded with —SiMe$_2$H) was then added into the resulting dioxirane solution in the flask. The mixture was stirred at room temperature for 2 hours. The silica was filtered, washed with acetone, and dried under vacuum.

In an alternative process, endcapped silica was reacted with an Oxone™ buffer solution and acetone to convert Si—H to Si—OH. The Oxone™ buffer solution was prepared as follows: 50 g Oxone™ was added into 400 ml 20 mM K$_2$HPO$_4$ solution cooled in a ice-water bath. 1M KOH solution was added until pH reached between 7.0-7.5.

The Oxone™ buffer solution was reacted with endcapped silica prepared according to Example 1 (silica bonded with —SiMeH (carbon loading 2.14%)) as following: 7.21 g silica with —SiMeH surface was added to 60 ml acetone cooled in an ice-water bath. The neutral Oxone™ buffer solution prepared above was then added dropwise while the mixture was well stirred. After addition, the mixture was stirred for 3 hours, then filtered, washed with 150 ml water/acetone (2:1 v/v ratio) and 50 ml water/acetone (1:1 v/v ratio). The silica was reslurried in 100 ml HCl solution (pH 2.0)/acetone (1:1 v/v ratio) for few minutes, filtered, washed with 50 ml water/ acetone (1:1 v/v ratio), 30 ml acetone and 30 ml ACN, and then was dried under vacuum at 110° C. overnight. The silica has a carbon loading of 1.73%.

Example 4

Reacting Endcapped Silanol with Coupling Agent

A coupling agent, e.g. a C18 silane, was bonded the endcapped silica of Example 2. 5.30 g silica with surface SiMeH converted to SiMe-OH (carbon loading 1.73%) was charged into a 250 ml three necked flask equipped with a Barrett trap with a water condenser on it. 50 ml toluene was added. 30 ml toluene was distilled out and collected in the Barrett trap. After the mixture was allowed to cool below 100° C., the Barrett trap was removed, and a new water condenser was attached. (Dimethylamino)dimethyloctadecylsilane (31.92 g, 89.74 mmol) was added.

The mixture was then stirred under reflux conditions overnight (18-24 hours). The silica was filtered, washed with 50 ml toluene, 50 ml THF, and 50 ml CH$_3$CN, and air-dried. The silica was then dried under vacuum at 120° C. overnight. The silica has a carbon loading of 12.49%. The silica was then further endcapped with trimethylsilane as usual, with a final carbon loading of 12.58%.

The present invention has thus been described with reference to specific non-limiting examples. The full scope of the present invention will be apparent from the appended claims.

What is claimed is:

1. A process for producing a chromatographic stationary phase for use in reversed-phase chromatography, comprising:
providing an inorganic oxide support material comprising surface hydroxyl groups;
reacting the surface hydroxyl groups with at least one endcapping reagent having a formula selected from the group consisting of formulas I, II, and III:

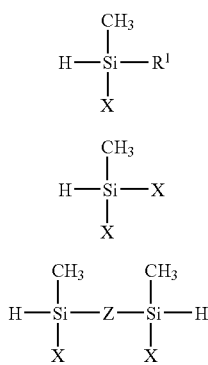

wherein, $R^1$ is hydrogen or methyl, X is halogen, $OR^2$ or $NR^3R^4$, and Z is —NH— or —$NR^5$—, wherein $R^2$ is $C_1$ to $C_{30}$ alkyl, $R^3$ and $R^4$ are independently hydrogen or $C_1$ to $C_{30}$ alkyl, and $R^5$ is methyl or ethyl, to provide a modified particulate support material having at least one endcap Si—H group;
converting at least one endcap Si—H group to an endcap silanol group; and
reacting the endcap silanol group with at least one silane coupling agent selected from the group consisting of formulas IV, V, VI, and VII:

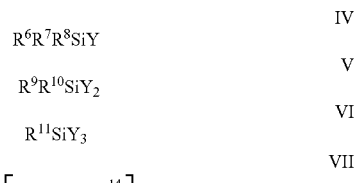

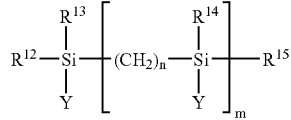

wherein
$R^{6-15}$ are independently hydrogen or $C_1$ to $C_{30}$ hydrocarbyl, optionally substituted with at least one reversed-phase chromatography ligand;
Y is halogen, $OR^2$ or $NR^3R^4$, wherein $R^2$ is $C_1$ to $C_{30}$ alkyl, and $R^3$ and $R^4$ are independently hydrogen or $C_1$ to $C_{30}$ alkyl;
m is 1 or greater; and
n is 1 or greater to provide a functionalized particulate support material.

2. The process according to claim 1, wherein the endcapping reagent is a silane according to formula I or II, and Y is a halogen, and the process further comprising adding an acid scavenger to the inert solvent.

3. The process according to claim 1, wherein at least one of $R^{6-15}$ is substituted with at least one reversed-phase chromatography ligand.

4. The process according to claim 1, wherein at least one of $R^{6-15}$ is a saturated or unsaturated hydrocarbyl, a cyclic hydrocarbyl, or an aryl hydrocarbyl.

5. The process according to claim 4, wherein said hydrocarbyl is $C_{18}H_{37}$ or $C_8H_{17}$.

6. The process according to claim 1, wherein said inorganic oxide support material is selected from the group consisting of porous particles, non-porous particles, porous membranes, and porous monoliths.

7. The process according to claim 1, wherein said inorganic oxide support material is selected from the group consisting of silica, hybrid silica, alumina, titanium oxide, and zirconium oxide.

* * * * *